(12) United States Patent
Park

(10) Patent No.: US 12,728,833 B2
(45) Date of Patent: Sep. 8, 2026

(54) VEHICLE CONTROL APPARATUS AND METHOD

(71) Applicants: HYUNDAI MOTOR COMPANY, Seoul (KR); KIA CORPORATION, Seoul (KR)

(72) Inventor: Yong Suk Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 172 days.

(21) Appl. No.: 18/440,639

(22) Filed: Feb. 13, 2024

(65) Prior Publication Data

US 2025/0091567 A1 Mar. 20, 2025

(30) Foreign Application Priority Data

Sep. 14, 2023 (KR) ........................ 10-2023-0122708

(51) Int. Cl.
*B60W 10/30* (2006.01)

(52) U.S. Cl.
CPC ......... *B60W 10/30* (2013.01); *B60W 2520/10* (2013.01); *B60W 2555/20* (2020.02)

(58) Field of Classification Search
CPC ............. B60W 10/30; B60W 2555/20; B60W 2520/10
See application file for complete search history.

(56) References Cited

U.S. PATENT DOCUMENTS

2018/0057012 A1* 3/2018 Delgado ............... E05F 15/695
2019/0340851 A1* 11/2019 Tokita .................. B60W 10/06
2021/0009055 A1* 1/2021 Brown ................ B60R 16/0237
2023/0272662 A1* 8/2023 Katayama .......... B60H 1/00771 454/75
2023/0356719 A1* 11/2023 Hernandez ............ B60W 10/30
2025/0091567 A1* 3/2025 Park ...................... E05F 15/695
2025/0153684 A1* 5/2025 Cheng ............. B60W 60/00182

* cited by examiner

*Primary Examiner* — Peter D Nolan
*Assistant Examiner* — Wae L Louie
(74) *Attorney, Agent, or Firm* — Lempia Summerfield Katz LLC

(57) ABSTRACT

A vehicle control apparatus and a method thereof are provided. The vehicle control apparatus includes a memory storing a program instruction and a processor that executes the program instruction. The processor controls a window of a vehicle in a first mode or a second mode, based on at least one of a speed of the vehicle, a position of the vehicle, weather, a wind speed, or a driving wind of the vehicle, or any combination thereof. At least one of the first mode, or the second mode, or any combination thereof controls an operation of the window of the vehicle for a plurality of sections divided based on a degree to which the window of the vehicle is closed.

18 Claims, 7 Drawing Sheets

VEHICLE CONTROL APPARATUS
100

PROCESSOR
110

MEMORY
120

FIG. 1

VEHICLE CONTROL APPARATUS AND METHOD

CROSS-REFERENCE TO RELATED APPLICATION

This application claims the benefit of priority to Korean Patent Application No. 10-2023-0122708, filed in the Korean Intellectual Property Office on Sep. 14, 2023, the entire contents of which are incorporated herein by reference.

TECHNICAL FIELD

The present disclosure relates to a vehicle control apparatus and a method, and more particularly, relates to technologies of controlling a window of a vehicle.

BACKGROUND

Recently, with the development and integration of various technical elements, the speed of a vehicle has increased in a fast time. Due to this, technologies for automatically opening or closing the window of the vehicle while driving may be applied to or implemented in the vehicle.

For example, a technology or the like for automatically closing the window when the vehicle enters a tunnel or automatically opening the window when there is a need to clean the air in the vehicle may be applied to or implemented in the vehicle.

In general, a window of a vehicle is frequently and automatically opened and closed by a certain speed. However, the window of the vehicle may not operate normally due to various factors such as high-speed driving of the vehicle, weather, and a driving wind of the vehicle. For example, when the window of the vehicle is closed while the vehicle is traveling at a high speed, the window may not be completely closed due to a driving wind of the vehicle (i.e., the airflow around the vehicle caused by the high speed driving).

As such, there is a need to address a problem in which the window of the vehicle is not normally closed according to the speed of the vehicle or the driving situation of the vehicle.

SUMMARY

The present disclosure has been made to solve the above-mentioned problems occurring in the prior art while advantages achieved by the prior art are maintained intact.

An aspect of the present disclosure provides a vehicle control apparatus for controlling a speed and power at which a window of a vehicle operates depending on a degree to which the window of the vehicle is closed to prevent a situation in which the window does not normally operate due to a driving wind of the vehicle or the like and a method thereof.

Another aspect of the present disclosure provides a vehicle control apparatus for controlling a window of a vehicle to smoothly close while reducing noise of the window of the vehicle when the vehicle travels at a low speed and controlling the window of the vehicle to completely close at a fast speed when the vehicle travels at a high speed to variably control the window of the vehicle in response to various situations and a method thereof.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle control apparatus may include a memory storing a program instruction and a processor that executes the program instruction. The processor may control a window of a vehicle in a first mode or a second mode, based on at least one of a speed of the vehicle, a position of the vehicle, weather, a wind speed, or a driving wind of the vehicle, or any combination thereof. At least one of the first mode, or the second mode, or any combination thereof may include a mode for controlling an operation of the window of the vehicle for a plurality of sections divided based on a degree to which the window of the vehicle is closed.

In an embodiment, the processor may control the window of the vehicle in the second mode, based on the speed of the vehicle being greater than a threshold speed at which the window of the vehicle does not normally operate.

In an embodiment, the processor may control the window of the vehicle in the second mode, based on at least one of the position of the vehicle, the weather, the wind speed, or the driving wind of the vehicle, or any combination thereof meeting a criterion in which the window of the vehicle does not normally operate.

In an embodiment, the processor may control the window of the vehicle in the first mode, based on the speed of the vehicle not being greater than a threshold speed at which the window of the vehicle does not normally operate and that at least one of the position of the vehicle, the weather, the wind speed, or the driving wind of the vehicle, or any combination thereof meets a criterion in which the window of the vehicle normally operates.

In an embodiment, the plurality of sections may include a first section, a second section, a third section, and a fourth section divided in an order in which the degree to which the window of the vehicle is closed is small. The processor, when controlling the window of the vehicle in the first mode, may operate the window of the vehicle at a first speed, in the first section, may operate the window of the vehicle such that a speed of the window of the vehicle decreases from the first speed to a second speed smaller than the first speed, in the second section, may operate the window of the vehicle at the second speed, in the third section, and may operate the window of the vehicle such that the speed of the window of the vehicle increases from the second speed to a third speed greater than or equal to the first speed, in the fourth section.

In an embodiment, the plurality of sections may include a first section, a second section, a third section, and a fourth section divided in an order in which the degree to which the window of the vehicle is closed is small. The processor, when controlling the window of the vehicle in the second mode, may operate the window of the vehicle at a fourth speed, in the first section, the second section, and the third section, and may operate the window of the vehicle such that a speed of the window of the vehicle increases to a fifth speed greater than the fourth speed, in the fourth section.

In an embodiment, the processor may operate the window of the vehicle such that the speed of the window of the vehicle increases to the fifth speed from the second section or may operate the window of the vehicle such that the speed of the window of the vehicle increases to the fifth speed from the third section, based on a condition in which the window of the vehicle operates at the fifth speed before the fourth section is met, in light of the at least one of the speed of the vehicle, the position of the vehicle, the weather, the wind speed, or the driving wind of the vehicle, or any combination thereof.

In an embodiment, the processor may control the window of the vehicle in the second mode, based on a prediction that the speed of the vehicle, in a predetermined distance of a road ahead, will be greater than a threshold speed at which the window of the vehicle does not normally operate. The predetermined distance of the road ahead may be set based on at least one of an operation speed of the window of the vehicle, the speed of the vehicle, convenience of a user, or a system of the vehicle, or any combination thereof.

In an embodiment, the processor may control the window of the vehicle in the second mode, based on a prediction that at least one of the position of the vehicle, the weather, the wind speed, or the driving wind of the vehicle, or any combination thereof will meet a criterion in which the window of the vehicle does not normally operate, in a predetermined distance of a road ahead. The predetermined distance of the road ahead may be set based on at least one of an operation speed of the window of the vehicle, the speed of the vehicle, convenience of a user, or a system of the vehicle, or any combination thereof.

In an embodiment, the processor may control the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead or before the operation of the window of the vehicle is completed, when a current speed of the vehicle is a speed at which the window of the vehicle is able to normally operate, at a time point when the window of the vehicle operates or a time point when the operation of the window of the vehicle starts. The predetermined distance of the road ahead may be set based on at least one of an operation speed of the window of the vehicle, the speed of the vehicle, convenience of a user, or a system of the vehicle, or any combination thereof.

In an embodiment, the at least one of the first mode, or the second mode, or any combination thereof may include a mode for controlling at least one of a speed at which the window of the vehicle operates or a force in which the window of the vehicle operates, or any combination thereof, for the plurality of sections divided based on the degree to which the window of the vehicle is closed.

According to another aspect of the present disclosure, a vehicle control method may include controlling, by a processor, a window of a vehicle in a first mode or a second mode, based on at least one of a speed of the vehicle, a position of the vehicle, weather, a wind speed, or a driving wind of the vehicle, or any combination thereof. At least one of the first mode, or the second mode, or any combination thereof may include a mode for controlling an operation of the window of the vehicle for a plurality of sections divided based on a degree to which the window of the vehicle is closed.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include controlling, by the processor, the window of the vehicle in the second mode, based on the speed of the vehicle being greater than a threshold speed at which the window of the vehicle does not normally operate.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include controlling, by the processor, the window of the vehicle in the second mode, based on at least one of the position of the vehicle, the weather, the wind speed, or the driving wind of the vehicle, or any combination thereof meeting a criterion in which the window of the vehicle does not normally operate.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include controlling, by the processor, the window of the vehicle in the first mode, based on the speed of the vehicle not being greater than a threshold speed at which the window of the vehicle does not normally operate and that at least one of the position of the vehicle, the weather, the wind speed, or the driving wind of the vehicle, or any combination thereof meets a criterion in which the window of the vehicle normally operates.

In the vehicle control method according to an embodiment of the present disclosure, the plurality of sections may include a first section, a second section, a third section, and a fourth section divided in an order in which the degree to which the window of the vehicle is closed is small. The controlling of the window of the vehicle in the first mode or the second mode, based on the at least one of the speed of the vehicle, the position of the vehicle, the weather, the wind speed, or the driving wind of the vehicle, or any combination thereof, by the processor may include: operating, by the processor, the window of the vehicle at a first speed, in the first section; operating, by the processor, the window of the vehicle such that a speed of the window of the vehicle decreases from the first speed to a second speed smaller than the first speed, in the second section; operating, by the processor, the window of the vehicle at the second speed, in the third section; and operating, by the processor, the window of the vehicle such that the speed of the window of the vehicle increases from the second speed to a third speed greater than or equal to the first speed, in the fourth section, when controlling the window of the vehicle in the first mode.

In the vehicle control method according to an embodiment of the present disclosure, the plurality of sections may include a first section, a second section, a third section, and a fourth section divided in an order in which the degree to which the window of the vehicle is closed is small. The controlling of the window of the vehicle in the first mode or the second mode, based on the at least one of the speed of the vehicle, the position of the vehicle, the weather, the wind speed, or the driving wind of the vehicle, or any combination thereof, by the processor may include: operating, by the processor, the window of the vehicle at a fourth speed, in the first section, the second section, and the third section; and operating, by the processor, the window of the vehicle such that a speed of the window of the vehicle increases to a fifth speed greater than the fourth speed, in the fourth section, when controlling the window of the vehicle in the second mode.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include operating, by the processor, the window of the vehicle such that the speed of the window of the vehicle increases to the fifth speed from the second section or operating, by the processor, the window of the vehicle such that the speed of the window of the vehicle increases to the fifth speed from the third section, based on a condition in which the window of the vehicle operates at the fifth speed before the fourth section is met, in light of the at least one of the speed of the vehicle, the position of the vehicle, the weather, the wind speed, or the driving wind of the vehicle, or any combination thereof.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include controlling, by the processor, the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead. The predetermined distance of the road ahead may be set based on at least one of an operation speed of the window of the vehicle, the speed of the vehicle, convenience of a user, or a system of the vehicle, or any combination thereof.

In the vehicle control method according to an embodiment of the present disclosure, the controlling of the window of the vehicle in the first mode or the second mode, based on the at least one of the speed of the vehicle, the position of the vehicle, the weather, the wind speed, or the driving wind of the vehicle, or any combination thereof, by the processor may include controlling, by the processor, the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead or before the operation of the window of the vehicle is completed, when a current speed of the vehicle is a speed at which the window of the vehicle is able to normally operate, at a time point when the window of the vehicle operates or a time point when the operation of the window of the vehicle starts. The predetermined distance of the road ahead may be set based on at least one of an operation speed of the window of the vehicle, the speed of the vehicle, convenience of a user, or a system of the vehicle, or any combination thereof.

BRIEF DESCRIPTION OF THE DRAWINGS

The above and other objects, features and advantages of the present disclosure should be more apparent from the following detailed description taken in conjunction with the accompanying drawings:

FIG. 1 is a block diagram illustrating a vehicle control apparatus according to an embodiment of the present disclosure;

DETAILED DESCRIPTION

Figure 2:
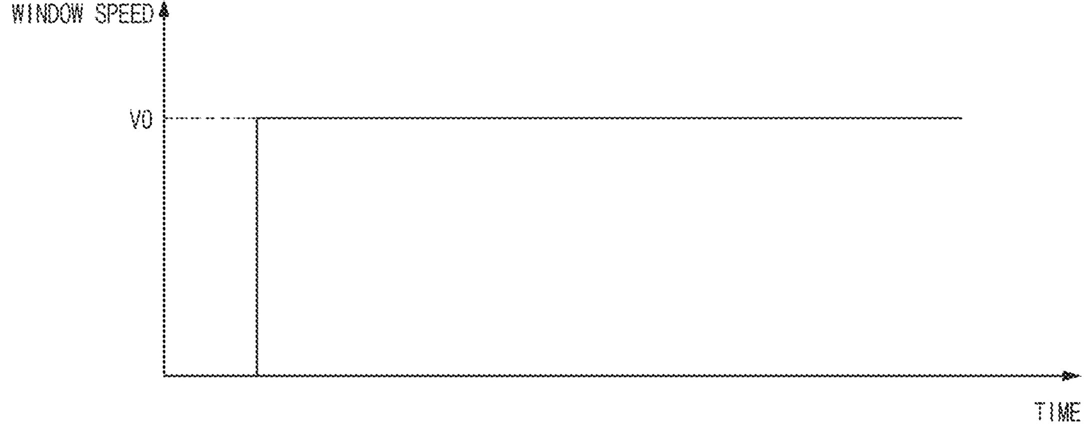
FIG. 2 is a graph illustrating an example in which a window of an existing vehicle operates at a certain speed, in conjunction with a vehicle control apparatus according to an embodiment of the present disclosure.

Hereinafter, some embodiments of the present disclosure are described in detail with reference to the drawings. In the drawings, the same reference numerals are used throughout to designate the same or equivalent components. In addition, a detailed description of well-known features or functions have been omitted in order not to unnecessarily obscure the gist of the present disclosure.

In describing components of embodiments of the present disclosure, the terms first, second, A, B, (a), (b), and the like may be used herein. These terms are only used to distinguish one component from another component, but do not limit the corresponding components irrespective of the order or priority of the corresponding components. Particularly, the expression "at least one of A, B, or C, or any combination thereof" may include "A", "B", or "C", or "AB", "BC", "AC", or "ABC", which is a combination thereof.

Furthermore, unless otherwise defined, all terms including technical and scientific terms used herein have the same meaning as being generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
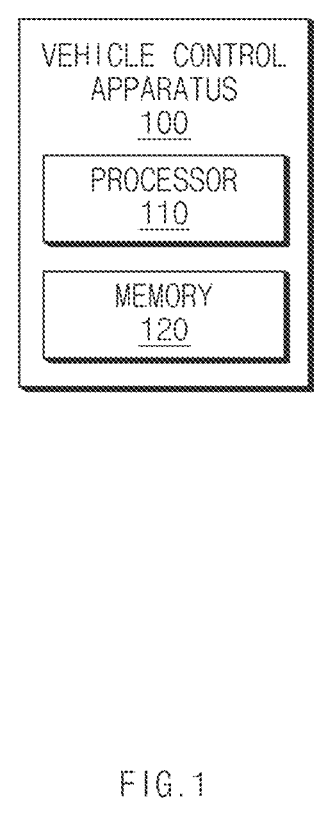

Hereinafter, embodiments of the present disclosure are described in detail with reference to FIGS. 1 to 7.

FIG. 1 is a block diagram illustrating a vehicle control apparatus according to an embodiment of the present disclosure.

According to an embodiment, a vehicle control apparatus 100 may include a processor 110 and a memory 120. The components of the vehicle control apparatus 100, which are shown in FIG. 1, are illustrative, and embodiments of the present disclosure are not limited thereto. For example, the vehicle control apparatus 100 may further include components which are not shown in FIG. 1.

According to an embodiment, the memory 120 may store a command or data. For example, the memory 120 may store one instruction or two or more instructions, when executed by the processor 110, causing the vehicle control apparatus 100 to perform various operations.

According to an embodiment, the memory 120 and the processor 110 may be implemented as one chipset and may store various pieces of information associated with the vehicle control apparatus 100. For example, the memory 120 may store data associated with an operation speed of a window of a vehicle.

According to an embodiment, the memory 120 may include a non-volatile memory (e.g., a read only memory (ROM)) and a volatile memory (e.g., a random access memory (RAM)).

According to an embodiment, the processor 110 may control the window of the vehicle in a first mode or a second mode, based on at least one of a speed of the vehicle, a position of the vehicle, weather, a wind speed, or a driving wind of the vehicle, or any combination thereof.

For example, the speed of the vehicle may include a current driving speed of the vehicle, and the driving speed of the vehicle may be obtained by means of a sensor or like which may measure the speed of the vehicle.

For example, the position of the vehicle may be obtained by means of a global positioning system (GPS) using an artificial satellite and may be obtained by means of an HD digital map including a detailed model of major landforms and features or the like.

For example, information associated with the weather may be obtained by means of a sensor which measures a temperature, humidity, or the like outside the vehicle. As another example, the processor 110 may receive weather information of an area based on the current position of the vehicle from an external server. In this case, the processor 110 may transmit and receive data through a communication device between the vehicle and the external server.

For example, information associated with the wind speed may be obtained by means of a sensor which measures a wind speed outside the vehicle. As another example, the processor 110 may receive a wind speed of the area based on the current position of the vehicle from the external server.

For example, the driving wind may include a wind which is blown as atmospheric pressure in front of the vehicle increases and atmospheric pressure together with eddies decreases behind the vehicle as the vehicle travels. The driving wind of the vehicle may be detected by means of a sensor. The sensor which measures a driving wind of the vehicle may be located at a place where there is a need to measure the driving wind. As a detailed example, the sensor which measures a driving wind may be located at a side surface of the vehicle to measure the driving wind that affects the window of the vehicle.

According to an embodiment, at least one of the first mode or the second mode, or any combination thereof, may include controlling an operation of the window of the vehicle at different sections of a plurality of sections (of window closure) divided based on a degree to which the window of the vehicle is closed.

For example, the processor 110 may differently or variably control a speed at which the window of the vehicle operates at each section of the plurality of sections of window closure.

Furthermore, for example, the processor 110 may differently or variably control a speed at which the window of the vehicle operates in the plurality of sections for each mode such as the first mode or the second mode. For example, the processor 110 may differently control a speed at which the window of the vehicle operates for each mode even in the same section.

According to an embodiment, the plurality of sections may include a first section, a second section, a third section, and a fourth section, which are divided in an order in which the degree to which the window of the vehicle is closed is small. Herein, the plurality of sections are not limited to the first to fourth sections, but may be divided into three sections or less and may be divided into five sections or more.

For example, the first section may correspond to a section in which the window of the vehicle starts to close from a state in which the window of the vehicle is completely open.

According to an embodiment, the degree to which the window of the vehicle is closed for dividing the plurality of sections may vary for each section. For example, the plurality of sections may be divided into a first section in which the degree to which the window of the vehicle is closed is greater than or equal to 0% and is less than 70%, a second section in which the degree to which the window of the vehicle is closed is greater than or equal to 70% and is less than 90%, a third section in which the degree to which the window of the vehicle is closed is greater than or equal to 90% and is less than 95%, and a fourth section in which the degree to which the window of the vehicle is closed is greater than or equal to 95% and is less than or equal to 100%.

As another example, the degrees to which the window of the vehicle is closed may be the same for each section of the plurality of sections. For example, the plurality of sections may be divided into a first section in which the degree to which the window of the vehicle is closed is greater than or equal to 0% and is less than 25%, a second section in which the degree to which the window of the vehicle is closed is greater than or equal to 25% and is less than 50%, a third section in which the degree to which the window of the vehicle is closed is greater than or equal to 50% and is less than 75%, and a fourth section in which the degree to which the window of the vehicle is closed is greater than or equal to 75% and is less than or equal to 100%.

According to an embodiment, when controlling the window of the vehicle in the first mode, the processor 110 may operate the window of the vehicle at a first speed in the first section.

For example, the first speed may include a speed at which the window of the vehicle is able to be stably closed. In this case, the window of the vehicle may be closed by keeping the first speed constant.

For example, when the window of the vehicle starts an operation of being closed in the first mode in a state in which it stops in the first section, it may accelerate to the first speed in the stopped state and may keep the first speed until the first section is ended (i.e., the window has closed in the first section).

According to an embodiment, the processor 110 may control the speed of the window of the vehicle to decrease from the first speed to a second speed smaller than the first speed, in the second section.

For example, when the window of the vehicle is closed greater than or equal to a certain portion, to reduce noise or smoothly close, it may be controlled to close at the second speed smaller than the first speed. Thus, the second speed may be set to a speed at which operation noise of the window of the vehicle is reduced or the window of the vehicle is able to smoothly close.

Thus, the processor 110 may operate the window of the vehicle such that the speed of the window of the vehicle decreases from the first speed in the first section to the second speed smaller than the first speed in the second section.

According to an embodiment, the processor 110 may keep the closure speed of the window of the vehicle constant at the second speed to operate the window of the vehicle. For example, when the degree to which the window of the vehicle is closed corresponds to the third section, the window of the vehicle may be maintained and closed at the second speed until the third section ends.

According to an embodiment, the processor 110 may operate the window of the vehicle such that the speed of the window of the vehicle increases from the second speed to a third speed which is greater than or equal to the first speed, in the fourth section. For example, the third speed may be set to a speed greater than the first speed and may be set to the same speed as the first speed.

For example, the fourth section may include a section immediately before the window of the vehicle is closed. Thus, the speed of the window of the vehicle may be controlled to increase to the third speed at which the window of the vehicle is able to be completely closed within a short time.

According to an embodiment, when controlling the window of the vehicle in the second mode, the processor 110 may operate the window of the vehicle at a fourth speed in the first section, the second section, and the third section.

For example, the first to third sections may be set to a section in which the degree to which the window of the vehicle is closed is relatively small. Thus, the fourth speed at which the window of the vehicle operates in the first to third sections may be set to a speed at which the window of the vehicle is able to be stably closed.

As a detailed example, the fourth speed in the second mode may be set to the same speed as the first speed in the first mode. As another example, the fourth speed in the second mode may be set to a speed greater than the first speed in the first mode, such that the window of the vehicle is able to be normally and completely closed when controlled in the second mode by the processor 110.

For example, when the window of the vehicle starts an operation of being closed in the second mode in a state in which it stops in the first section, it may accelerate from the stopped state to the fourth speed and may maintain the fourth speed until the first to third sections have ended (i.e., closed).

According to an embodiment, the processor 110 may operate the window of the vehicle such that the speed of the window of the vehicle increases to a fifth speed greater than the fourth speed, in the fourth section.

For example, the fourth section may include a section immediately before the window of the vehicle is closed. When the window of the vehicle is obstructed to be normally closed in the fourth section due to a driving wind of the vehicle or the like, the processor 110 may operate the window of the vehicle to close at a high speed and may control the window to be completely closed despite the obstruction of the driving wind or the like. Thus, the fifth speed may be set to a fast speed at which the window of the vehicle is able to be completely closed despite the obstruction of the driving wind or the like. For example, the processor 110 may control the window of the vehicle such that the speed of the window of the vehicle increases to the fifth speed greater than the fourth speed.

According to an embodiment, the processor 110 may control the window of the vehicle in the second mode, based on the speed of the vehicle being identified as being greater than a threshold speed at which the window of the vehicle does not normally operate.

For example, when the vehicle travels at a high speed, a driving wind may be generated. When the driving wind of the vehicle is strong, this may obstruct the closing of the window of the vehicle. For example, the driving wind of the vehicle may strongly act on the window of the vehicle immediately before the window of the vehicle is completely closed.

For example, the threshold speed at which the window of the vehicle does not normally operate may include a speed at which a driving wind or the like which obstructs the closing of the window of the vehicle is generated. In one example, the threshold speed may be set to 110 km/h.

For example, the threshold speed at which the window of the vehicle does not normally operate may be set by a system and/or may be set by a user.

According to an embodiment, when the speed of the vehicle is greater than the threshold speed, the processor 110 may control the window of the vehicle in the second mode for operating the window of the vehicle to quickly close.

For example, when the vehicle travels at a speed greater than 110 km/h, the processor 110 may operate the window of the vehicle at the fourth speed in the first section, the second section, and the third section and may operate the window of the vehicle such that the speed of the window of the vehicle increases to the fifth speed greater than the fourth speed in the fourth section.

According to an embodiment, when the speed of the vehicle is greater than a speed range in which the speed of the vehicle is able to be measured, the processor 110 may determine that there is an error in the measured speed of the vehicle.

For example, when it is determined (i.e., incorrectly measured) that the vehicle travels at a speed greater than a maximum speed at which the vehicle is able to travel, the processor 110 may determine that there is an error in the measured speed of the vehicle and may fail to operate the window of the vehicle in the second mode.

As a detailed example, when it is determined that the speed of the vehicle is greater than 225 km/h, corresponding to the maximum speed of the vehicle, the processor 110 may determine that there is an error in the measured speed of the vehicle and may fail to operate the window of the vehicle in the second mode.

According to an embodiment, the processor 110 may control the window of the vehicle in the second mode, based on at least one of the position of the vehicle, the weather, the wind speed, or the driving wind of the vehicle, or any combination thereof, being identified as meeting a criterion in which the window of the vehicle does not normally operate.

For example, when the position of the vehicle, the weather, the wind speed, the driving wind of the vehicle, or the like obstructs the closing of the window of the vehicle, the processor 110 may control the window of the vehicle in the second mode for operating the window of the vehicle to quickly close.

For example, when the vehicle is located in an area, such as a highway or a coast, with a relatively strong wind speed, the processor 110 may control the window of the vehicle in the second mode for operating the window of the vehicle to quickly close.

For example, when a condition in which weather including a temperature, humidity, a driving wind, and the like is able to obstruct the closing of the window of the vehicle is met, the processor 110 may control the window of the vehicle in the second mode for operating the window of the vehicle to quickly close.

For example, when a condition in which the driving wind generated due to the driving of the vehicle is able to obstruct the closing of the window of the vehicle is met, the processor 110 may control the window of the vehicle in the second mode for operating the window of the vehicle to quickly close.

For example, the condition for obstructing the closing of the window of the vehicle may be determined on the basis of the wind speed. In detail, the processor 110 may determine whether the condition for obstructing the closing of the window of the vehicle is met, on the basis of whether a wind speed sensed from an external sensor of the vehicle or a wind speed received from a server outside the vehicle is greater than a threshold wind speed. In one example, the threshold wind speed may be set to 10 m/s.

According to an embodiment, the processor 110 may control the window of the vehicle in the first mode, based on it being identified that the speed of the vehicle is not greater than the threshold speed at which the window of the vehicle does not normally operate and that the at least one of the position of the vehicle, the weather, the wind speed, or the driving wind of the vehicle, or any combination thereof meets a criterion in which the window of the vehicle normally operates.

For example, the threshold speed at which the window of the vehicle does not normally operate may include a speed at which a driving wind or the like which obstructs the closing of the window of the vehicle is generated.

In one example, the threshold speed may be set to 110 km/h. When the speed of the vehicle is less than or equal to 110 km/h, the window of the vehicle may normally operate despite a driving wind of the vehicle or the like.

Furthermore, when the position of the vehicle, the weather, the wind speed, the driving wind of the vehicle, or the like meets the criterion in which the window of the vehicle normally operates, the window of the vehicle may normally operate.

As another example, when the position of the vehicle, the weather, the wind speed, the driving wind of the vehicle, or the like does not correspond to the condition in which it is able to obstruct the closing of the window of the vehicle, the processor 110 may determine that the criterion in which the window of the vehicle normally operates is met.

As a detailed example, when the vehicle is not located in an area, such as the highway or the coast, with a relatively strong wind speed; when the weather including the temperature, the humidity, the wind speed, or the like corresponds to a degree to which it does not obstruct the closing of the window of the vehicle; or when the driving wind of the vehicle corresponds to a degree to which it does not obstruct the closing of the window of the vehicle, the processor 110 may determine that the criterion in which the window of the vehicle normally operates is met.

According to an embodiment, when the condition in which the speed of the vehicle is not greater than the threshold speed at which the window of the vehicle does not normally operate; and the position of the vehicle, the weather, the wind speed, the driving wind of the vehicle, and the like meet the criterion in which the window of the vehicle normally operates, the processor 110 may: operate the window of the vehicle at the first speed in the first section; operate the window of the vehicle such that the speed of the window of the vehicle decreases from the first speed to the second speed smaller than the first speed in the second section; operate the window of the vehicle at the second speed in the third section; and operate the window of the vehicle such that the speed of the window of the vehicle increases from the second speed to the third speed which is greater than or equal to the first speed in the fourth section.

For example, when the vehicle drives in the city at a speed of 110 km/h or less in weather with little wind, the processor 110 may control the window of the vehicle to close at a certain speed, may decrease and increase a speed at which the window is closed in a certain section before the window is completely closed to decrease noise of the window, and may control the window to smoothly close.

According to an embodiment, although the condition in the second mode in which the window of the vehicle operates at the fifth speed from the fourth section is met, the processor 110 may operate the window of the vehicle at the fifth speed from a section prior to the fourth section, in light of at least one of the speed of the vehicle, the position of the vehicle, the weather, the wind speed, or the driving wind of the vehicle, or any combination thereof.

For example, when the speed of the vehicle is excessively greater than the threshold speed at which the window does not normally operate or when the wind speed outside the vehicle is excessively greater than the threshold wind speed which obstructs the window of the vehicle not to normally operate, there is a need to increase a speed at which the window of the vehicle is closed before the fourth section. In this case, the processor 110 may operate the window of the vehicle at the fifth speed from the section prior to the fourth section. Herein, the fifth speed may be set to a fast speed at which the window of the vehicle is able to be completely closed despite the obstruction of the driving wind or the like.

As a detailed example, the processor 110 may operate the window of the vehicle such that the speed of the window of the vehicle increases to the fifth speed from the second section or may operate the window of the vehicle such that the speed of the window of the vehicle increases to the fifth speed from the third section.

The section that starts to operate the window of the vehicle such that the speed of the window of the vehicle increases to the fifth speed may be set based on a degree to which the speed of the vehicle is excessively greater than the threshold speed or a degree to which the wind speed outside the vehicle is excessively greater than the threshold wind speed. In other words, when the speed of the vehicle and the wind speed outside the vehicle are fast, the processor 110 may operate the window of the vehicle such that the speed of the window of the vehicle increases to the fifth speed from a section in which the degree to which the window of the vehicle is closed is small.

As another example, when operating the window of the vehicle such that the speed of the window of the vehicle increases to the fifth speed from the second section or the third section, the processor 110 may operate the window of the vehicle at a speed greater than the fifth speed in the fourth section and may control the window of the vehicle to completely close even when the driving wind or the like is very strong.

According to an embodiment, when it is predicted that the speed of the vehicle will be greater than the threshold speed at which the window of the vehicle does not normally operate, in a predetermined distance of a road ahead, the processor 110 may control the window of the vehicle in the second mode.

According to an embodiment, the predetermined distance of the road ahead may be set by an operation speed of the window of the vehicle, a speed of the vehicle, convenience of a user, a system of the vehicle, or the like.

Furthermore, the predetermined distance of the road ahead may include a distance set for the road ahead based on a destination input to navigation or the like.

For example, when the window of the vehicle operates, the predetermined distance of the road ahead may be set to a distance at which it is able to change a mode for operating the window of the vehicle before the window of the vehicle is completely closed based on the operation speed of the window.

For example, the predetermined distance of the road ahead may be set to a distance at which it is able to be predicted that the speed of the vehicle will be greater than the threshold speed based on the driving speed of the vehicle.

As another example, the predetermined distance of the road ahead may be directly set by the user or may be set by the system of the vehicle.

According to an embodiment, when it is predicted that the speed of the vehicle will be greater than the threshold speed at which the window of the vehicle does not normally operate, in the predetermined distance of the road ahead, the processor 110 may operate the window of the vehicle in the second mode such that the window of the vehicle is able to close at a fast speed in advance.

According to an embodiment, when it is predicted that the speed of the vehicle will be greater than the threshold speed at which the window of the vehicle does not normally operate, in the predetermined distance of the road ahead, while operating the window of the vehicle in the first mode, the processor 110 may change the operation of the window of the vehicle to the second mode to operate the window of the vehicle.

According to an embodiment, when it is predicted that at least one of the position of the vehicle, the weather, the wind speed, or the driving wind of the vehicle, or any combination thereof meets the criterion in which the window of the vehicle does not normally operate, in the predetermined distance of the road ahead, the processor 110 may control the window of the vehicle in the second mode.

For example, when the vehicle is scheduled to enter a highway or a coast road or is scheduled to enter a road in weather in which a wind speed or the like is strong, the processor 110 may operate the window of the vehicle in the second mode in advance, such that the window of the vehicle is able to close at a fast speed.

As another example, when it is predicted that the position of the vehicle, the weather, the wind speed, the driving wind of the vehicle, or the like will meet the criterion in which the window of the vehicle does not normally operate, in the predetermined distance of the road ahead, while operating the window of the vehicle in the first mode, the processor 110 may change the operation of the window of the vehicle to the second mode to operate the window of the vehicle.

According to an embodiment, when it is predicted that the speed of the vehicle, the position of the vehicle, the weather, the wind speed, the driving wind of the vehicle, or the like will meet the criterion in which the window of the vehicle does not normally operate, in the predetermined distance of the road ahead, although the speed of the vehicle is the speed at which the window of the vehicle is able to normally operate, at a time point when the window of the vehicle operates or a time point when the operation of the window of the vehicle starts, the processor 110 may control the window of the vehicle in the second mode.

For example, the speed at which the window of the vehicle is able to normally operate may be set to a speed of 110 km/h or less. Furthermore, when the processor 110 is able to normally operate the window of the vehicle, it may control the window of the vehicle in the first mode.

Thus, while the vehicle is traveling at 80 km/h, when operating the window of the vehicle, the processor 110 may control the window of the vehicle in the first mode.

As a detailed example, although the vehicle is currently traveling at 80 km/h, as it is expected in the predetermined distance of the road ahead that the speed of the vehicle will be greater than 110 km/h, that the vehicle will enter a highway or a coast road, or that weather with strong winds on the road ahead is expected, the processor 110 may operate the window of the vehicle in the second mode when it is predicted that the criterion in which the window of the vehicle does not normally operate will be met.

According to an embodiment, when it is predicted that the speed of the vehicle, the position of the vehicle, the weather, the wind speed, the driving wind of the vehicle, or the like will meet the criterion in which the window of the vehicle does not normally operate, before the operation of the window of the vehicle is completed, although the speed of the vehicle is the speed at which the window of the vehicle is able to normally operate, at the time point when the window of the vehicle operates or the time point when the operation of the window of the vehicle starts, the processor 110 may control the window of the vehicle in the second mode.

As a detailed example, although the window of the vehicle starts to operate while the vehicle is currently driving at 80 km/h, before the operation of the window of the vehicle is completed, as it is expected that the speed of the vehicle will be greater than 110 km/h, that the vehicle will enter a highway or a coast road, or that weather with strong winds on the road ahead is expected, when it is predicted that the criterion in which the window of the vehicle does not normally operate will be met, the processor 110 may operate the window of the vehicle in the second mode.

According to an embodiment, at least one of the first mode for controlling the window of the vehicle or the second mode for controlling the window of the vehicle, or any combination thereof, may be to control at least one of a speed at which the window of the vehicle operates, or a force at which the window of the vehicle operates, or any combination thereof, for each section of the plurality of sections divided based on the degree to which the window of the vehicle is closed.

For example, the processor 110 may differently or variably control the force at which the window of the vehicle operates, for each section of the plurality of sections divided based on the degree to which the window of the vehicle is closed. As a detailed example, in the first section, the second section, the third section, and the fourth section divided in an order in which the degree to which the window of the vehicle is closed is small, a relatively large force may be required to close the window in the fourth section which is immediately before the window of the vehicle is closed. Thus, the processor 110 may apply a force at which the window of the vehicle operates in the fourth section to be greater than another section.

For example, the processor 110 may differently or variably control a force at which the window of the vehicle operates for each section, depending on the first mode or the second mode. As a detailed example, as it is determined that the window of the vehicle does not normally operate due to the speed of the vehicle, the wind speed, or the like, when the processor 110 operates the window of the vehicle in the second mode, a force at which the processor 110 operates the window of the vehicle in the fourth section in the second mode may be greater than a force at which the window of the vehicle operates in the fourth section in the first mode.

FIG. 2 is a graph illustrating an example in which a window of an existing vehicle operates at a certain speed, in conjunction with a vehicle control apparatus according to an embodiment of the present disclosure.

Referring to FIG. 2, the graph of FIG. 2 illustrates that the window of the existing vehicle operates at a certain speed V0 until the window is completely closed from a time point when the window starts to close.

As such, when the window of the vehicle operates at the certain speed V0, noise may occur in a process in which the window operates.

Furthermore, when the window of the vehicle operates at the certain speed V0, there may occur a situation in which the window of the vehicle does not normally operate due to an external factor, such as a speed of the vehicle, a position of the vehicle, weather, a wind speed, or a driving wind of the vehicle.

Thus, there is a need for a technology for differently or variably controlling a speed at which the window of the vehicle operates depending on various situations and conditions.

Figure 3:
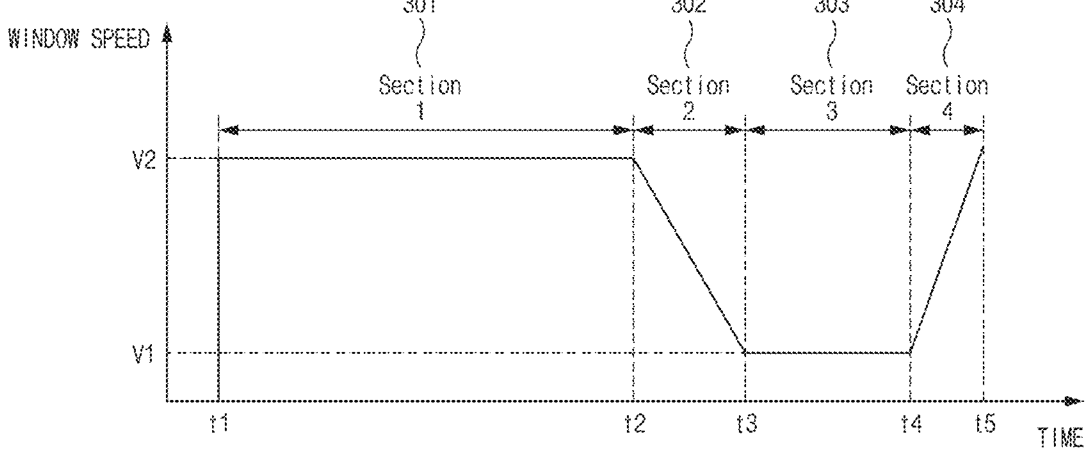
FIG. 3 is a graph illustrating a change in speed of a window of a vehicle, when the window of the vehicle operates in a first mode, in a vehicle control apparatus according to an embodiment of the present disclosure.

FIG. 3 is a graph illustrating a change in speed of a window of a vehicle, when the window of the vehicle operates in a first mode, in a vehicle control apparatus according to an embodiment of the present disclosure.

According to an embodiment, when at least one of a speed of a vehicle, a position of the vehicle, weather, a wind speed, or a driving wind of the vehicle, or any combination thereof meets a criterion in which the window of the vehicle normally operates, a processor may control the window of the vehicle in a second mode.

According to an embodiment, when the window of the vehicle operates in the first mode, as shown in the graph of FIG. 3, the speed of the window may vary for each section of a plurality of sections divided based on a degree to which the window of the vehicle is closed. In detail, on the graph of FIG. 3, the x-axis may be displayed as time and the y-axis may be displayed as a speed at which the window of the vehicle operates.

According to an embodiment according to FIG. 3, the plurality of sections may include a first section 301, a second section 302, a third section 303, and a fourth section 304, in an order in which the degree to which the window of the vehicle is closed is small.

According to an embodiment, a time point when the first section 301 of the window starts to close may be displayed as “t1”, a time point when the first section 301 ends and the second section 302 starts may be displayed as “t2”, a time point when the second section 302 ends and the third section 303 starts may be displayed as “t3”, a time point when the third section 303 ends and the fourth section 304 starts may be displayed as “t4”, and a time point when the fourth section 304 ends may be displayed as “t5”, on the graph. Herein, “t1” may be a time point when the window of the vehicle starts to close in a state where it is completely open, and “t5” may be a time point when the window of the vehicle is completely closed.

According to an embodiment, a speed at which the window of the vehicle is able to stably close may be set to a “first speed V2”, and a speed at which the window of the vehicle is able to smoothly close with low noise may be set to a “second speed V1”.

According to an embodiment, when controlling the window of the vehicle in the first mode, the processor may control a speed of the window for the first to fourth sections 301 to 304 as follows.

The processor may operate the window of the vehicle at the first speed V2 in the first section 301. In this case, the window of the vehicle may keep the first speed V2 constant to close. When the window of the vehicle starts an operation of being closed in the first mode in a state in which it stops in the first section 301, the processor may accelerate the window of the vehicle from the stopped state to the first speed V2 and may operate the window of the vehicle to maintain the first speed V2 to close until the first section 301 ends.

The processor may control the speed of the window of the vehicle to decrease from the first speed V2 to the second speed V1 smaller than the first speed V2. For example, when the window of the vehicle corresponds to the second section 302 as it is closed greater than or equal to a certain portion, to reduce noise or smoothly close, the processor may operate the window of the vehicle to close at the second speed V1 smaller than the first speed V2.

The processor may keep the window of the vehicle constant at the second speed V1 to operate the window of the vehicle in the third section 303. For example, when the degree to which the window of the vehicle is closed corresponds to the third section 303, the window of the vehicle may be kept and closed at the second speed V1 until the third section 303 ends.

The processor may operate the window of the vehicle such that the speed of the window of the vehicle increases from the second speed V1 to a third speed which is greater than or equal to the first speed V2 in the fourth section 304. For example, the third speed may be set to a speed greater than the first speed V2 and may be set to the same speed as the first speed V2. The processor may quickly accelerate and operate the window of the vehicle to the third speed, such that the window of the vehicle is able to completely close in a short time.

According to an embodiment, a section in which the processor controls the speed of the window may vary with a degree to which the window of the vehicle is closed at a time point when the window of the vehicle starts to operate.

According to an embodiment, the degree to which the window of the vehicle is closed may be set to a first section from 0% or more to less than 70%, a second section from 70% or more to less than 90%, a third section from 90% or more to less than 95%, and a fourth section from 95% or more to 100% or less.

For example, when the window of the vehicle is closed by 80% at a time point when the window of the vehicle starts to operate, the processor may control the window of the vehicle at a speed corresponding to the second section. In this case, the processor may operate the window of the vehicle such that the speed of the window of the vehicle decreases from the first speed V2 to the second speed V1 smaller than the first speed V2.

For example, when the window of the vehicle is closed by 98% at a time point when the window of the vehicle starts to operate, the processor may control the window of the vehicle at a speed corresponding to the fourth section. In this case, the processor may operate the window of the vehicle such that the speed of the window of the vehicle increases from the second speed V1 to the third speed which is greater than or equal to the first speed V2.

According to an embodiment according to FIG. 3, the processor may differently or variably control a speed at which the window operates depending on the degree to which the window of the vehicle is closed, thus operating the window of the vehicle to reduce operation noise of the window or smoothly close the window.

Figure 4:
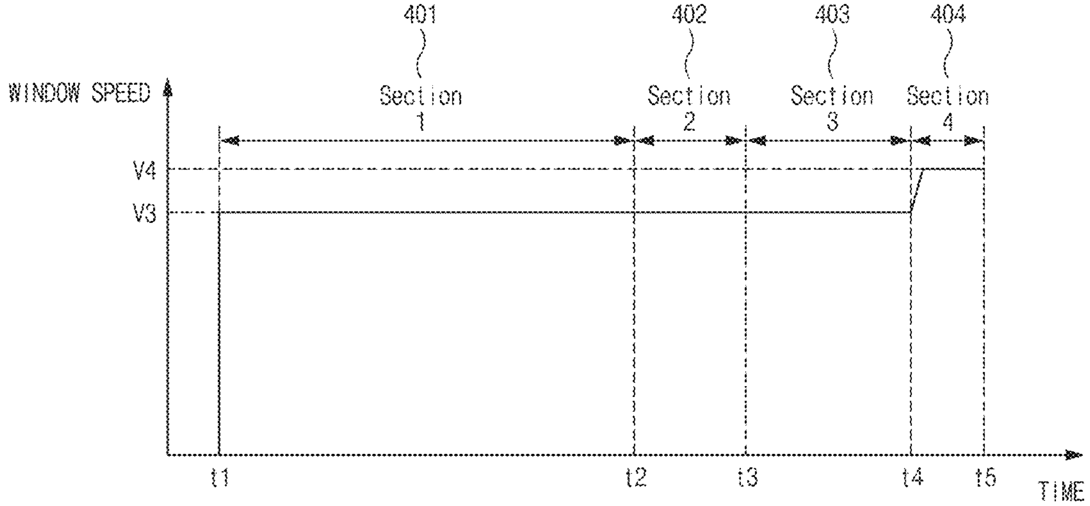
FIG. 4 is a graph illustrating a change in speed of a window of a vehicle, when the window of the vehicle operates in a second mode, in a vehicle control apparatus according to an embodiment of the present disclosure.

FIG. 4 is a graph illustrating a change in speed of a window of a vehicle, when the window of the vehicle operates in a second mode, in a vehicle control apparatus according to an embodiment of the present disclosure.

According to an embodiment, when at least one of a speed of a vehicle, a position of the vehicle, weather, a wind speed, or a driving wind of the vehicle, or any combination thereof meets a criterion in which the window of the vehicle does not normally operate, a processor may control the window of the vehicle in a second mode.

According to an embodiment, when the window of the vehicle operates in the second mode, as shown in the graph of FIG. 4, the speed of the window may vary for each section of a plurality of sections divided based on a degree to which the window of the vehicle is closed. In detail, on the graph of FIG. 4, the x-axis may be displayed as time and the y-axis may be displayed as a speed at which the window of the vehicle operates.

According to an embodiment according to FIG. 4, the plurality of sections may include a first section 401, a second section 402, a third section 403, and a fourth section 404, in an order in which the degree to which the window of the vehicle is closed is small.

According to an embodiment, a time point when the first section 401 of the window starts to close may be displayed as "t1", a time point when the first section 401 ends and the second section 402 starts may be displayed as "t2", a time point when the second section 402 ends and the third section 403 starts may be displayed as "t3", a time point when the third section 403 ends and the fourth section 404 starts may be displayed as "t4", and a time point when the fourth section 404 ends may be displayed as "t5", on the graph. Herein, "t1" may be a time point when the window of the vehicle starts to close in a state where it is completely open, and "t5" may be a time point when the window of the vehicle is completely closed.

According to an embodiment, a speed at which the window of the vehicle is able to stably close may be set to a "fourth speed V3", and a fast speed at which the window of the vehicle is able to completely close despite obstruction of a driving wind or the like may be set to a "fifth speed V4".

According to an embodiment, when controlling the window of the vehicle in the second mode, the processor 110 may control a speed of the window for the first to fourth sections 401 to 404 as follows.

The processor 110 may operate the window of the vehicle at the fourth speed V3 in the first section 401, the second section 402, and the third section 403. For example, the first to third sections 401 to 403 may be set to a section in which the degree to which the window of the vehicle is closed is relatively small. Thus, the processor 110 may control the window of the vehicle at the fourth speed V3 at which the window of the vehicle is able to stably close, in the first to third sections 401 to 403. For example, the fourth speed V3 may be set to the same speed as the first speed V2 in the first mode.

The processor 110 may operate the window of the vehicle such that the speed of the window of the vehicle increases to a fifth speed V4 greater than the fourth speed V3 in the fourth section 404.

According to an embodiment, the fifth speed V4 may be set to a fast speed at which the window of the vehicle is able to completely close despite obstruction of a driving wind or the like. For example, the processor 110 may control the speed of the window of the vehicle to increase to the fifth speed V4 greater than the fourth speed V3.

For example, the fourth section 404 may include a section immediately before the window of the vehicle is closed. When the window of the vehicle is obstructed and cannot normally close in the fourth section 404 due to a driving wind of the vehicle or the like, the processor 110 may operate the window of the vehicle to close at a fast speed and may control the window of the vehicle to completely close despite the obstruction of the driving wind or the like.

Although not illustrated in FIG. 4, according to an embodiment, when there is a need to control the window of the vehicle at a high speed before the fourth section 404, in light of at least one of a speed of the vehicle, a position of the vehicle, weather, a wind speed, or a driving wind of the vehicle, or any combination thereof, the processor 110 may operate the window of the vehicle at the fifth speed V4 before the fourth section 404.

For example, when the speed of the vehicle is excessively greater than a threshold speed at which the window does not normally operate or when the wind speed outside the vehicle is excessively greater than a threshold wind speed which obstructs the window of the vehicle to not normally operate, the processor 110 may operate the window of the vehicle at the fifth speed V4 from a section prior to the fourth section 404.

As another example, when operating the window of the vehicle such that the speed of the window of the vehicle increases to the fifth speed V4 from the second section 402 or the third section 403, the processor 110 may operate the window of the vehicle at a speed greater than the fifth speed V4 in the fourth section 404 and may control the window of the vehicle to completely close even when the driving wind or the like is very strong.

According to an embodiment, like the control in the first mode in FIG. 3, even when the window of the vehicle is controlled by the second mode of FIG. 4, a section in which the processor 110 controls a speed of the window may vary with a degree to which the window is closed at a time point when the window of the vehicle starts to operate.

For example, when the window of the vehicle is closed by 98% at the time point when the window of the vehicle starts to operate, the processor 110 may control the window of the vehicle at a speed corresponding to the fourth section 404. In this case, the processor 110 may operate the window of the vehicle such that the speed of the window of the vehicle immediately increases to the fifth speed V4 greater than the fourth speed V3.

According to an embodiment according to FIG. 4, when the window of the vehicle does not normally operate due to the speed of the vehicle, the position of the vehicle, the weather, the wind speed, the driving wind of the vehicle, or the like, the processor 110 may control the window of the vehicle at a high speed, thus operating the window of the vehicle to completely close despite the obstruction of the driving wind or the like.

Figure 5:
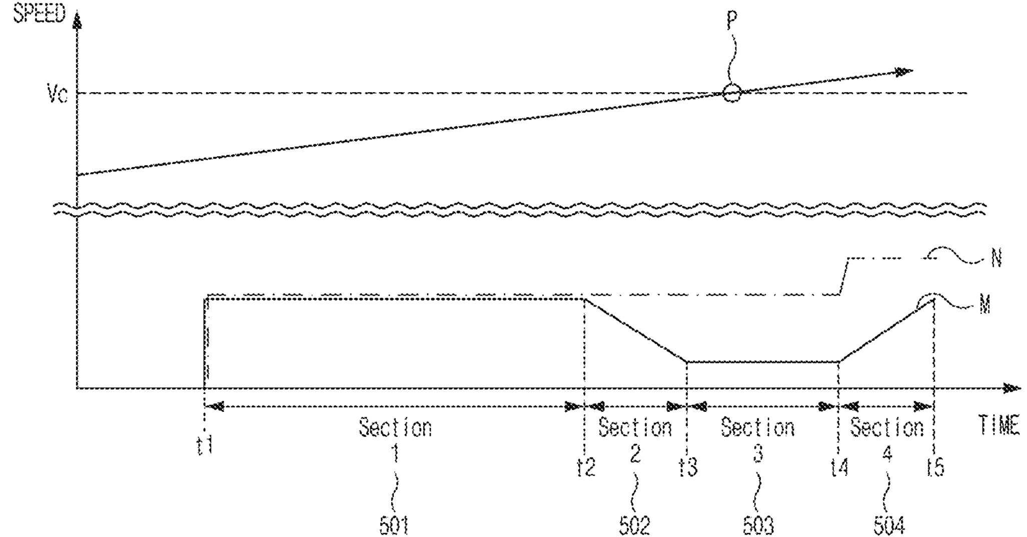
FIG. 5 is a graph illustrating an example of operating a window of a vehicle in a second mode, when it is predicted that a criterion in which the window of the vehicle does not normally operate in a predetermined distance of a road ahead will be met, although the window of the vehicle is able to operate in a first mode at a time point when the operation of the window of the vehicle starts, in a vehicle control apparatus according to an embodiment of the present disclosure.

FIG. 5 is a graph illustrating an example of operating a window of a vehicle in a second mode, when it is predicted that a criterion in which the window of the vehicle does not normally operate in a predetermined distance of a road ahead will be met, although the window of the vehicle is able to operate in a first mode at a time point when the operation of the window of the vehicle starts, in a vehicle control apparatus according to an embodiment of the present disclosure.

According to an embodiment, a processor 110 may control the window of the vehicle in a first mode M or a second mode N, depending on whether at least one of a speed of a vehicle, a position of the vehicle, weather, a wind speed, or a driving wind of the vehicle, or any combination thereof meets a criterion in which the window of the vehicle does not normally operate.

According to an embodiment, "Vc" may include a threshold speed of a driving wind or the like that obstructs the closing of the window of the vehicle. In one example, the threshold speed Vc may be set to 110 km/h.

According to an embodiment according to FIG. 5, a plurality of sections may include a first section 501, a second section 502, a third section 503, and a fourth section 504, in an order in which the degree to which the window of the vehicle is closed is small.

According to an embodiment, when it is predicted that the speed of the vehicle, the position of the vehicle, the weather, the wind speed, the driving wind of the vehicle, or the like will meet the criterion in which the window of the vehicle does not normally operate, in the predetermined distance of the road ahead, although the current speed of the vehicle is a speed at which the window of the vehicle is able to normally operate, at a time point when the window of the vehicle operates or a time point when the operation of the window of the vehicle starts, the processor 110 may control the window of the vehicle in the second mode N. Herein, the predetermined distance of the road ahead may be set to a distance at which it is able to change a mode for operating the window of the vehicle before the window of the vehicle is completely closed based on the operation speed of the window.

For example, when the speed of the vehicle is not greater than the threshold speed Vc at the time point when the window of the vehicle operates or the time point when the operation of the window of the vehicle starts, the processor 110 may control the window of the vehicle in the first mode M.

However, for example, although the current speed of the vehicle is the speed at which the window of the vehicle is able to normally operate, when it is predicted that the speed of the vehicle will be greater (P) than the threshold speed Vc before the operation of the window is completed, the processor 110 may control the window of the vehicle in the second mode N.

According to an embodiment, before operating the window of the vehicle, when it is predicted that the speed of the vehicle will be greater (P) than the threshold speed Vc before the operation of the window is completed, the processor 110 may immediately operate the window of the vehicle in the second mode N.

According to an embodiment, after already operating the window of the vehicle in first mode M, when it is predicted that the speed of the vehicle will be greater (P) than the threshold speed Vc before the operation of the window is completed, the processor 110 may change and operate the window of the vehicle from the second mode N to the first mode M.

According to an embodiment according to FIG. 5, although it is able to currently and normally operate the window of the vehicle, when it is predicted that the speed of the vehicle, the wind speed, or the like will meet a criterion in which the window of the vehicle does not normally operate in a certain distance of the road ahead, the processor 110 may operate the window of the vehicle in the second mode N, thus preventing a situation in which the window of the vehicle is not completely closed although the speed of the vehicle, the wind speed, or the like changes.

Figure 6:
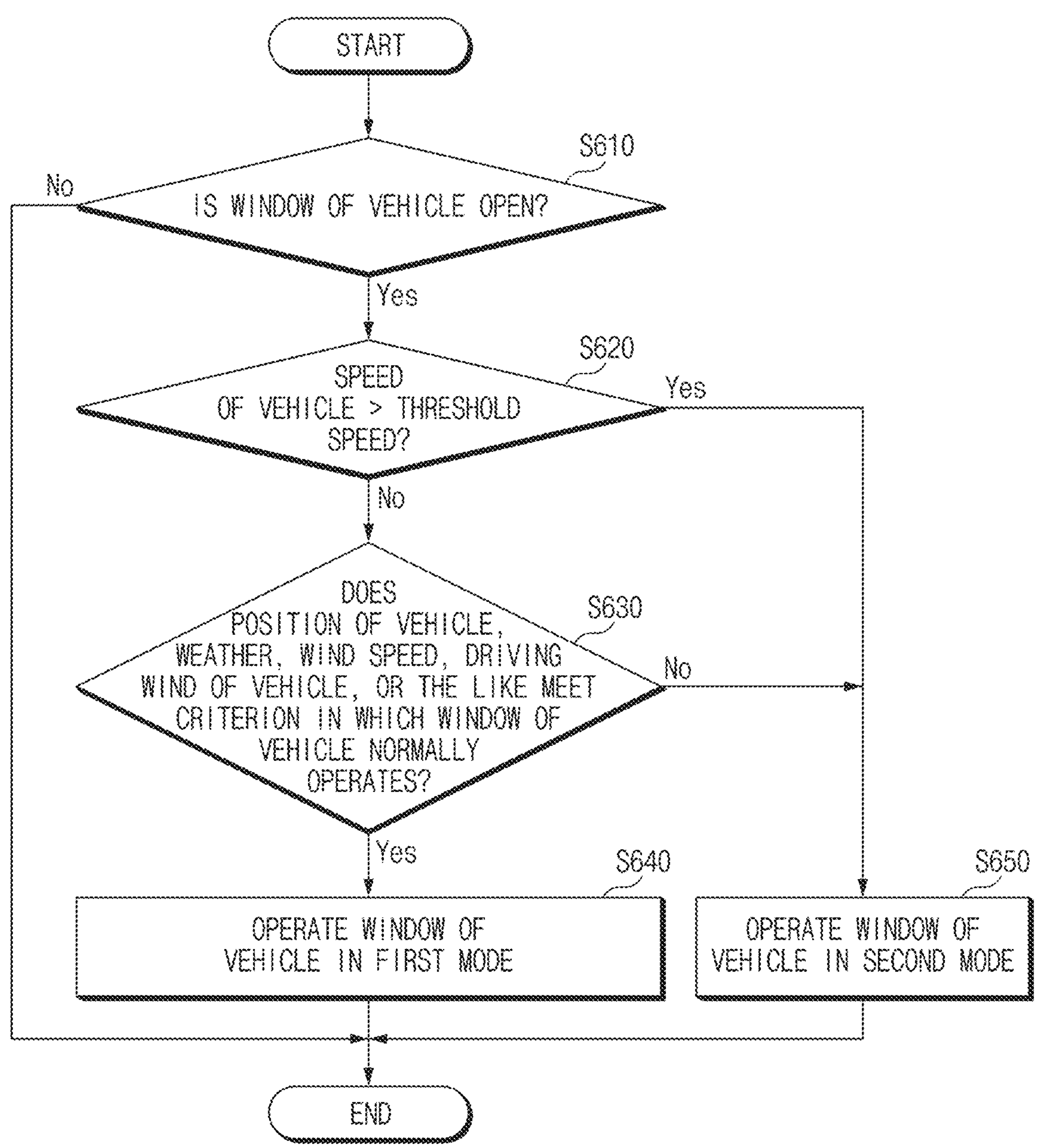
FIG. 6 is a flowchart for describing a vehicle control method according to an embodiment of the present disclosure.

FIG. 6 is a flowchart for describing a vehicle control method according to an embodiment of the present disclosure.

According to an embodiment, the vehicle control method according to an embodiment of the present disclosure may include controlling, by a processor, a window of a vehicle in a first mode or a second mode, based on at least one of a speed of the vehicle, a position of the vehicle, weather, a wind speed, or a driving wind of the vehicle, or any combination thereof. Herein, at least one of the first mode or the second mode, or any combination thereof, may include a mode for controlling an operation of the window of the vehicle for each section of a plurality of sections divided based on a degree to which the window of the vehicle is closed.

According to an embodiment, the plurality of sections may include a first section, a second section, a third section, and a fourth section, which are divided in an order in which the degree to which the window of the vehicle is closed is small.

According to an embodiment, in S610, the processor may determine whether the window of the vehicle is open. When the window of the vehicle is closed, because there is no need to operate the window, the processor may end the process without additional determination.

According to an embodiment, when the window of the vehicle is open, in S620, the processor may determine whether the speed of the vehicle is greater than a threshold speed at which the window of the vehicle does not normally operate. For example, the threshold speed at which the window of the vehicle does not normally operate may be set to 110 km/h. For example, when the speed of the vehicle is greater than the threshold speed, the driving wind of the vehicle or the like may obstruct the closing of the window.

According to an embodiment, when the speed of the vehicle is greater than the threshold speed at which the window of the vehicle does not normally operate (S620—Yes), in S650, the processor may operate the window of the vehicle in the second mode.

According to an embodiment, the operating (S650) of the window of the vehicle in the second mode may include operating, by the processor, the window of the vehicle at a fourth speed in the first section, the second section, and the third section and operating, by the processor, the window of the vehicle such that the speed of the window of the vehicle increases to a fifth speed greater than a fourth speed in the fourth section.

The processor may control the window of the vehicle at a high speed in the second mode, thus operating the window of the vehicle to completely close despite the obstruction of the driving wind or the like.

According to an embodiment, when the speed of the vehicle is not greater than the threshold speed at which the window of the vehicle does not normally operate (S620—No), in S630, the processor may determine whether at least one of the position of the vehicle, the weather, the wind speed, or the driving wind of the vehicle, or any combination thereof meets a criterion in which the window of the vehicle normally operates.

For example, the processor may determine whether the criterion in which the window of the vehicle normally operates is met, by means of: whether the vehicle is located in an area, such as a highway or a coast, with a relatively strong wind speed; whether weather including a temperature, humidity, a wind speed, or the like corresponds to a degree to which it obstructs the closing of the window of the vehicle; whether the driving wind of the vehicle corresponds to a degree to which it obstructs the closing of the window of the vehicle; or the like.

According to an embodiment, when the at least one of the position of the vehicle, the weather, the wind speed, or the driving wind of the vehicle, or any combination thereof, does not meet the criterion in which the window of the vehicle normally operates (S630—No), because it is determined that the driving wind of the vehicle or the like obstructs the closing of the window of the vehicle, in S650, the processor may operate the window of the vehicle in the second mode.

According to an embodiment, when the at least one of the position of the vehicle, the weather, the wind speed, or the driving wind of the vehicle, or any combination thereof meets the criterion in which the window of the vehicle normally operates (S630—Yes), because it is determined that the driving wind of the vehicle or the like does not obstruct the closing of the window of the vehicle, in S640, the processor may operate the window of the vehicle in the first mode.

According to an embodiment, the operating (S640) of the window of the vehicle in the first mode may include: operating, by the processor, the window of the vehicle at a first speed, in the first section; operating, by the processor, the window of the vehicle such that the speed of the vehicle decreases from the first speed to a second speed smaller than the first speed, in the second section; operating, by the processor, the window of the vehicle at the second speed, in the third section; and operating, by the processor, the window of the vehicle such that the speed of the window of the vehicle increases from the second speed to a third speed which is greater than or equal to the first speed, in the fourth section.

The processor may differently or variably control a speed at which the window of the vehicle operates depending on the degree to which the window of the vehicle is closed, thus operating the window of the vehicle to reduce operation noise of the window or smoothly close the window.

Figure 7:
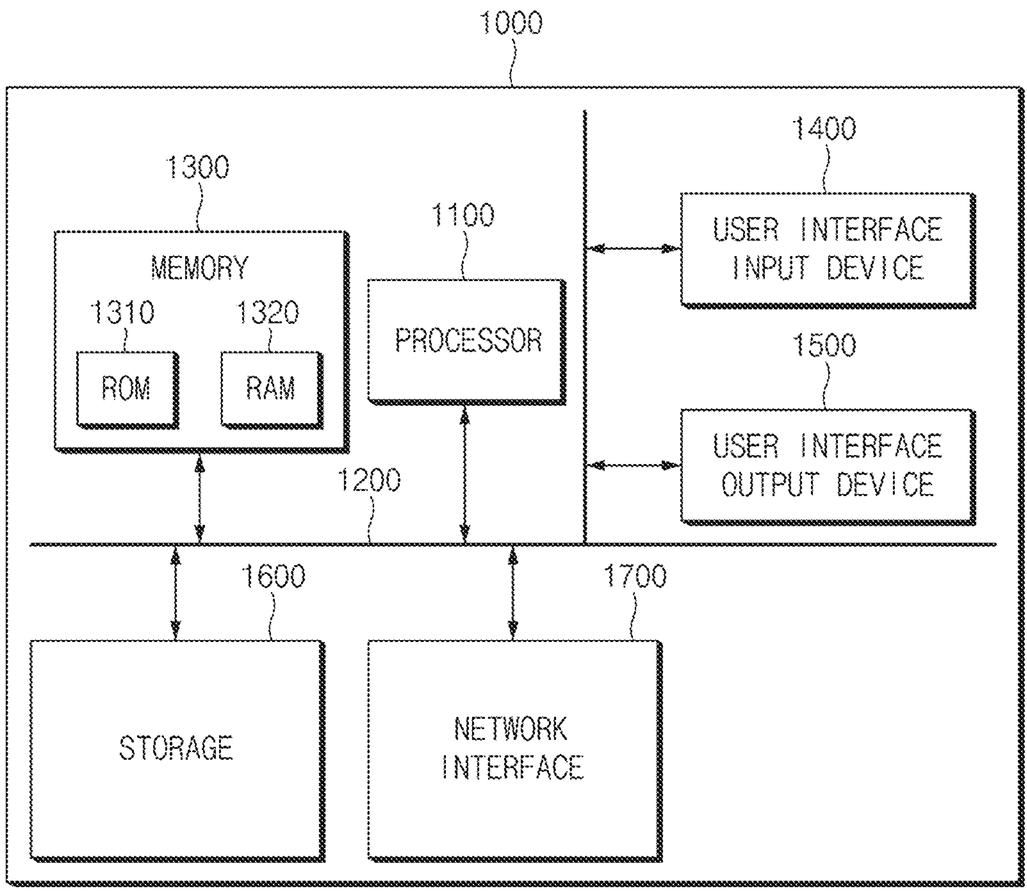
FIG. 7 illustrates a computing system associated with a vehicle control apparatus or a vehicle control method according to an embodiment of the present disclosure.

FIG. 7 illustrates a computing system associated with a vehicle control apparatus or a vehicle control method according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may control a speed and power at which the window of the vehicle operates depending on a degree to which the window of the vehicle is closed, thus preventing a situation in which the window does not normally operate due to a driving wind of the vehicle or the like.

Furthermore, the present technology may control the window of the vehicle to smoothly close while reducing noise of the window of the vehicle when the vehicle travels at a low speed and may control the window of the vehicle to completely close at a fast speed when the vehicle travels at a high speed, thus variably controlling the window of the vehicle in response to various situations.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus, comprising:

a memory storing a program instruction; and a processor configured to execute the program instruction, wherein the processor controls a window of a vehicle in a first mode or a second mode, based on at least one of a speed of the vehicle, a position of the vehicle, weather, a wind speed, or a driving wind of the vehicle, or any combination thereof, and wherein at least one of the first mode or the second mode includes a mode for controlling an operation of the window of the vehicle for a plurality of sections divided based on a degree to which the window of the vehicle is closed, wherein the plurality of sections includes a first section, a second section, a third section, and a fourth section divided in an order in which the degree to which the window of the vehicle is closed is small, and wherein, when controlling the window of the vehicle in the second mode, the processor is configured to:

operate the window of the vehicle at a fourth speed, in the first section, the second section, and the third section; and operate the window of the vehicle such that a speed of the window of the vehicle increases to a fifth speed greater than the fourth speed, in the fourth section.

2. The vehicle control apparatus of claim 1, wherein the processor controls the window of the vehicle in the second mode, based on the speed of the vehicle being greater than a threshold speed at which the window of the vehicle does not normally operate.

3. The vehicle control apparatus of claim 1, wherein the processor controls the window of the vehicle in the second mode, based on at least one of the position of the vehicle, the weather, the wind speed, or the driving wind of the vehicle, or any combination thereof meeting a criterion in which the window of the vehicle does not normally operate.

4. The vehicle control apparatus of claim 1, wherein the processor controls the window of the vehicle in the first mode, based on the speed of the vehicle not being greater than a threshold speed at which the window of the vehicle does not normally operate and that at least one of the position of the vehicle, the weather, the wind speed, or the driving wind of the vehicle, or any combination thereof meets a criterion in which the window of the vehicle normally operates.

5. The vehicle control apparatus of claim 1, wherein, when controlling the window of the vehicle in the first mode, the processor:

operates the window of the vehicle at a first speed, in the first section;

operates the window of the vehicle such that a speed of the window of the vehicle decreases from the first speed to a second speed smaller than the first speed, in the second section;

operates the window of the vehicle at the second speed, in the third section; and operates the window of the vehicle such that the speed of the window of the vehicle increases from the second speed to a third speed greater than or equal to the first speed, in the fourth section.

6. The vehicle control apparatus of claim 1, wherein the processor operates the window of the vehicle such that the speed of the window of the vehicle increases to the fifth speed from the second section or operates the window of the vehicle such that the speed of the window of the vehicle increases to the fifth speed from the third section, based on a condition in which the window of the vehicle operates at the fifth speed before the fourth section is met, in light of the at least one of the speed of the vehicle, the position of the vehicle, the weather, the wind speed, or the driving wind of the vehicle, or any combination thereof.

7. The vehicle control apparatus of claim 1, wherein the processor controls the window of the vehicle in the second mode, based on a prediction that the speed of the vehicle, in a predetermined distance of a road ahead, will be greater than a threshold speed at which the window of the vehicle does not normally operate, and wherein the predetermined distance of the road ahead is set based on at least one of an operation speed of the window of the vehicle, the speed of the vehicle, convenience of a user, or a system of the vehicle, or any combination thereof.

8. The vehicle control apparatus of claim 1, wherein the processor controls the window of the vehicle in the second mode, based on a prediction that at least one of the position of the vehicle, the weather, the wind speed, or the driving wind of the vehicle, or any combination thereof will meet a criterion in which the window of the vehicle does not normally operate, in a predetermined distance of a road ahead, and wherein the predetermined distance of the road ahead is set based on at least one of an operation speed of the window of the vehicle, the speed of the vehicle, convenience of a user, or a system of the vehicle, or any combination thereof.

9. The vehicle control apparatus of claim 1, wherein the processor controls the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead or before the operation of the window of the vehicle is completed, when a current speed of the vehicle is a speed at which the window of the vehicle is able to normally operate, at a time point when the window of the vehicle operates or a time point when the operation of the window of the vehicle starts, and wherein the predetermined distance of the road ahead is set based on at least one of an operation speed of the window of the vehicle, the speed of the vehicle, convenience of a user, or a system of the vehicle, or any combination thereof.

10. The vehicle control apparatus of claim 1, wherein the at least one of the first mode, or the second mode, or any combination thereof includes a mode for controlling at least one of a speed at which the window of the vehicle operates or a force in which the window of the vehicle operates, or any combination thereof, for the plurality of sections divided based on the degree to which the window of the vehicle is closed.

11. A vehicle control method, comprising:

controlling, by a processor, a window of a vehicle in a first mode or a second mode, based on at least one of a speed of the vehicle, a position of the vehicle, weather, a wind speed, or a driving wind of the vehicle, or any combination thereof, and wherein at least one of the first mode or the second mode includes a mode for controlling an operation of the window of the vehicle for a plurality of sections divided based on a degree to which the window of the vehicle is closed, wherein the plurality of sections includes a first section, a second section, a third section, and a fourth section divided in an order in which the degree to which the window of the vehicle is closed is small, and wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

operating, by the processor, the window of the vehicle at a fourth speed, in the first section, the second section, and the third section; and operating, by the processor, the window of the vehicle such that a speed of the window of the vehicle increases to a fifth speed greater than the fourth speed, in the fourth section, when the processor controls the window of the vehicle in the second mode.

12. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

controlling, by the processor, the window of the vehicle in the second mode, based on the speed of the vehicle being greater than a threshold speed at which the window of the vehicle does not normally operate.

13. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

controlling, by the processor, the window of the vehicle in the second mode, based on at least one of the position of the vehicle, the weather, the wind speed, or the driving wind of the vehicle, or any combination thereof meeting a criterion in which the window of the vehicle does not normally operate.

14. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

controlling, by the processor, the window of the vehicle in the first mode, based on the speed of the vehicle not being greater than a threshold speed at which the window of the vehicle does not normally operate and that at least one of the position of the vehicle, the weather, the wind speed, or the driving wind of the vehicle, or any combination thereof meets a criterion in which the window of the vehicle normally operates.

15. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

operating, by the processor, the window of the vehicle at a first speed, in the first section;

operating, by the processor, the window of the vehicle such that a speed of the window of the vehicle decreases from the first speed to a second speed smaller than the first speed, in the second section;

operating, by the processor, the window of the vehicle at the second speed, in the third section; and operating, by the processor, the window of the vehicle such that the speed of the window of the vehicle increases from the second speed to a third speed greater than or equal to the first speed, in the fourth section, when the processor controls the window of the vehicle in the first mode.

16. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

operating, by the processor, the window of the vehicle such that the speed of the window of the vehicle increases to the fifth speed from the second section or operating, by the processor, the window of the vehicle such that the speed of the window of the vehicle increases to the fifth speed from the third section, based on a condition in which the window of the vehicle operates at the fifth speed before the fourth section is met, in light of the at least one of the speed of the vehicle, the position of the vehicle, the weather, the wind speed, or the driving wind of the vehicle, or any combination thereof, when the processor controls the window of the vehicle in the second mode.

17. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

controlling, by the processor, the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead, and wherein the predetermined distance of the road ahead is set based on at least one of an operation speed of the window of the vehicle, the speed of the vehicle, convenience of a user, or a system of the vehicle, or any combination thereof.

18. The vehicle control method of claim 11, wherein the controlling of the window of the vehicle in the first mode or the second mode, based on the at least one of the speed of the vehicle, the position of the vehicle, the weather, the wind speed, or the driving wind of the vehicle, or any combination thereof, by the processor includes:

controlling, by the processor, the window of the vehicle in the second mode, based on a prediction that the at least one of the speed of the vehicle, the position of the vehicle, the weather, the wind speed, or the driving wind of the vehicle, or any combination thereof will meet a criterion in which the window of the vehicle does not normally operate, in a predetermined distance of a road ahead or before the operation of the window of the vehicle is completed, when a current speed of the vehicle is a speed at which the window of the vehicle is able to normally operate, at a time point when the window of the vehicle operates or a time point when the operation of the window of the vehicle starts, and wherein the predetermined distance of the road ahead is set based on at least one of an operation speed of the window of the vehicle, the speed of the vehicle, convenience of a user, or a system of the vehicle, or any combination thereof.

* * * * *